July 18, 1967 — B. CASSIDY — 3,331,548
BOOK CARTON
Filed May 24, 1965 — 5 Sheets-Sheet 1

INVENTOR.
BENJAMIN CASSIDY
BY
ATTORNEYS

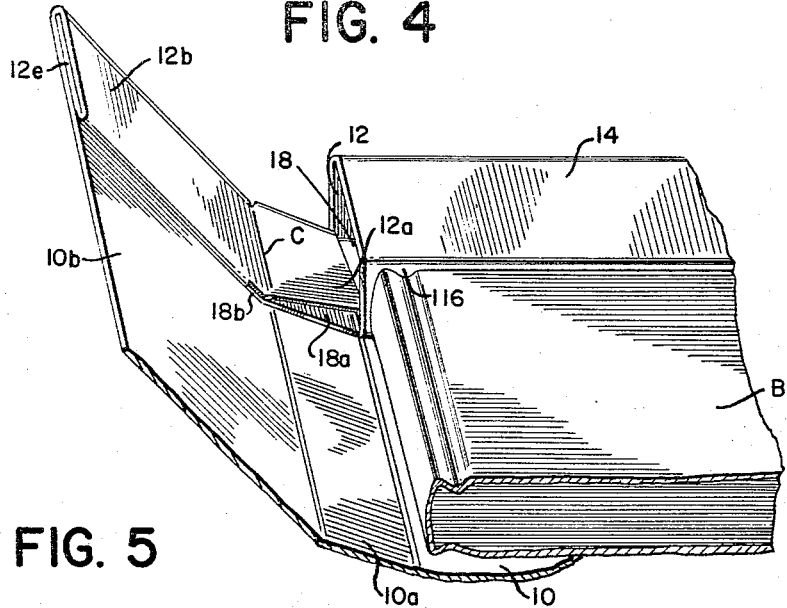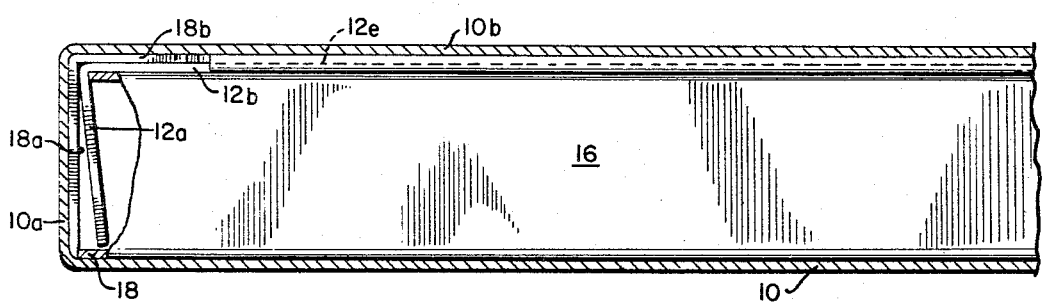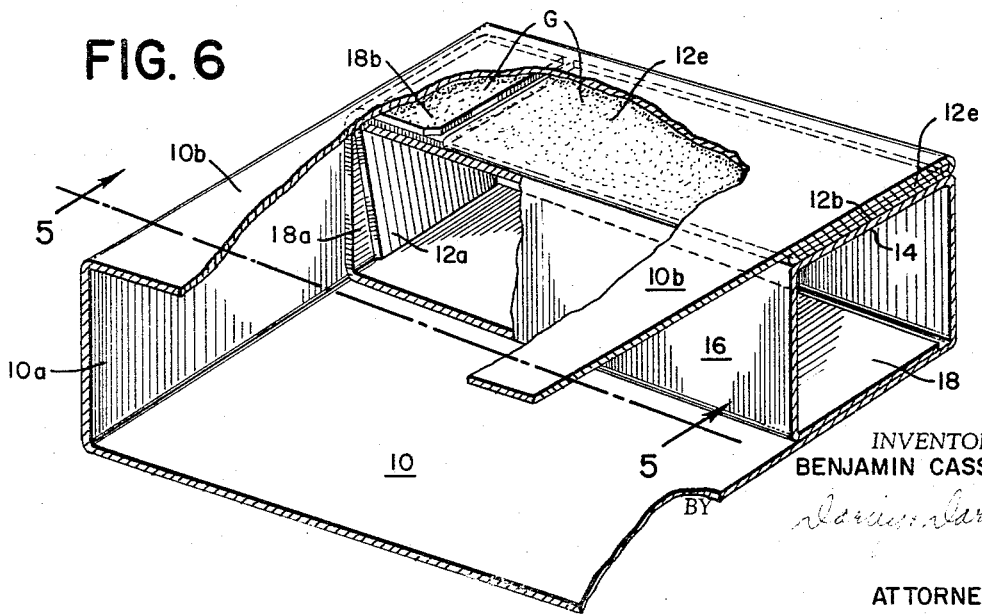

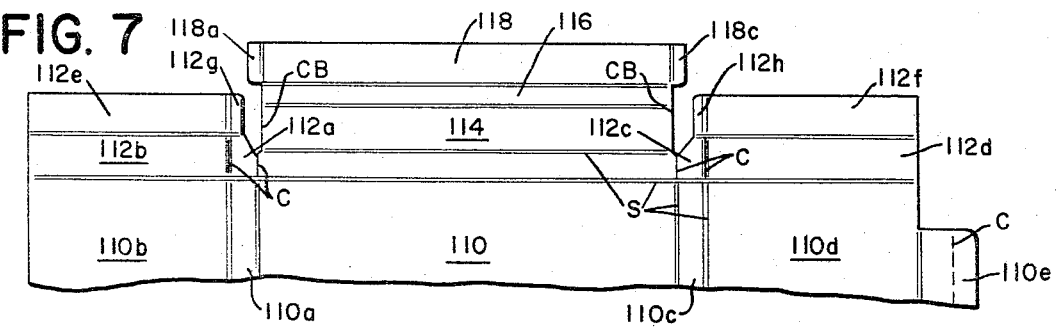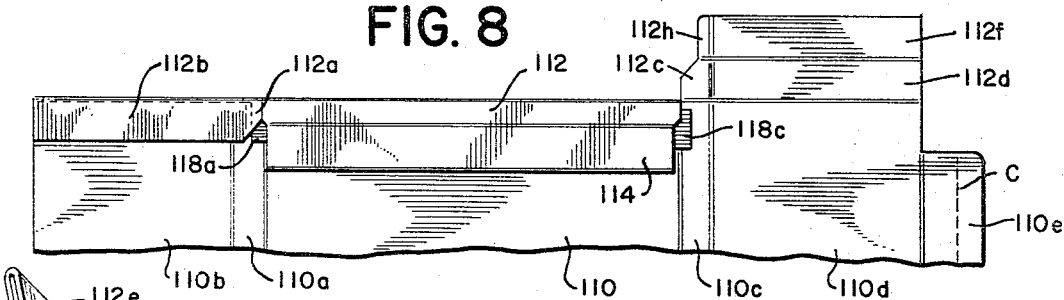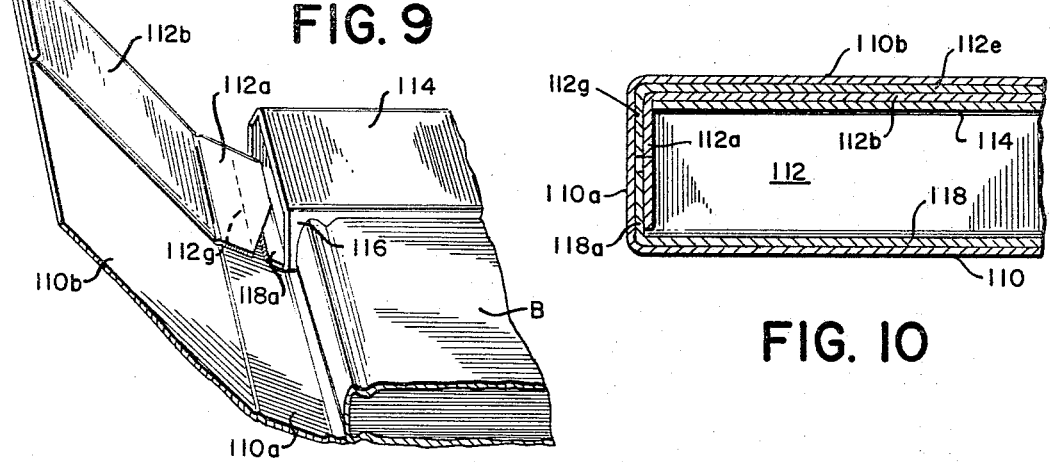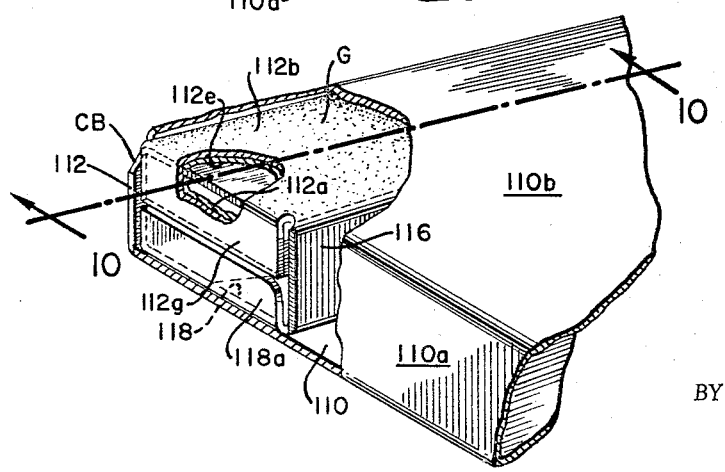

INVENTOR.
BENJAMIN CASSIDY
BY
ATTORNEYS

INVENTOR.
BENJAMIN CASSIDY

BY

ATTORNEYS

United States Patent Office 3,331,548
Patented July 18, 1967

3,331,548
BOOK CARTON
Benjamin Cassidy, Waldwick, N.J., assignor to Federal Carton Corporation, North Bergen, N.J., a corporation of New York
Filed May 24, 1965, Ser. No. 458,119
7 Claims. (Cl. 229—40)

This invention relates to cartons made of fiber board and constructed with various forms of corner reinforcement so as to substantially increase the resistance of the carton to crushing and destruction under impact at the corners.

A primary object of this invention is to provide a carton of this type which is particularly useful in the packaging of perishable or easily damagable objects, such as books, for example, so as to protect the corners of the books against damage due to impacts encountered in the shipping thereof.

Another object of the invention is to provide carton blanks of this type in which all the carton parts form a unitary blank of such form as to be capable of being blanked out in a single operation.

A further object of the invention is to provide a carton blank shaped and scored so as to facilitate its processing to a form suitable for shipment to the point of use, adapted to easy erection of that point and closing and sealing after deposit of the contents therein, all operations being by machinery.

Other and more detailed objects of the invention will be apparent from the following detailed description of the three embodiments of the invention selected for disclosure herein and illustrated in the accompanying drawings:

In those drawings:

FIGURE 4 is a broken perspective view showing the relationship of the parts in a position intermediate to complete closing of the container;

FIGURE 5 is a cross-sectional view taken on the line 5—5 of FIGURE 6;

FIGURE 6 is a perspective view of one corner of the carton in closed condition with the various parts broken away for better illustrative purposes;

FIGURE 7 is a plan view of the upper half of a modified form of carton in accordance with this invention;

FIGURE 8 shows some of the parts of the blank in folded position;

FIGURE 9 is a broken perspective view of the carton construction of the FIG. 7 modification showing the relationship of the parts in a partially closed condition;

FIGURE 10 is a cross-sectional view taken on the line 10—10 of FIGURE 11;

FIGURE 11 is a perspective view of a corner of the carton completely closed with various parts broken away for better illustrative purposes;

Cartons of foldable fibrous material constructed especially for the packaging and transportation of damagable objects, such as books, must meet a series of important requirements in order to be useful. Books are packaged and shipped in large quantities requiring, first of all, a carton made of a minimum number of parts and capable of being blanked out with high speed blanking machinery.

These blanks must be so constructed as to be of single piece construction and capable of machine processing to an intermediate state best adapted for the packaging and shipping of the cartons themselves.

At the point of use these partially prepared cartons must be capable of machine erection, filling, closing and sealing at high speeds to be economical.

Figure 1:
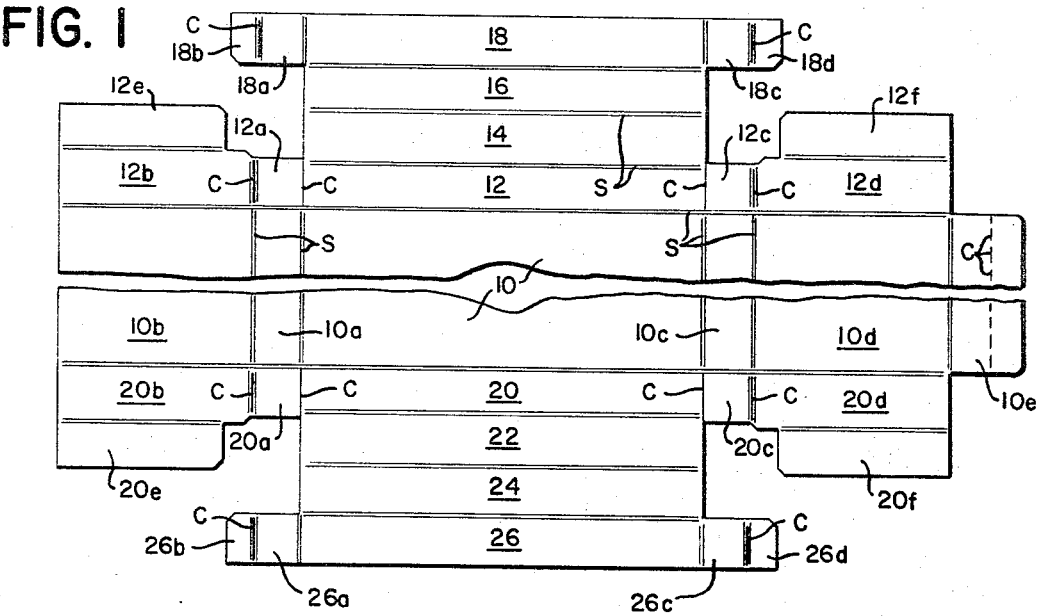
FIGURE 1 is a plan view of a carton blank in accordance with this invention for one form thereof.

Finally the completed carton must be capable of protecting, in the case of books, the corners from shocks normally encountered in transportation. The three forms of cartons illustrative of the principles of this invention have been designed to meet all the conditions outlined above. The first construction is illustrated in FIGS. 1 to 6 inclusive. The blank from which the carton is formed is shown in FIG. 1 as it comes from the blanking machine. It is constructed of any suitable form of fibrous material commonly used for this purpose and consists of a series of connected panels which are defined primarily by double score lines S. The bottom of the finished container is formed by the panel 10, which has the connected longitudinal extensions 10a and 10b at one side and 10c, 10d and 10e at the other side. The extensions 10b and 10d in turn have lateral extensions comprising panels formed by double score lines. Thus, the panel 10b has the extensions 12b and 12e at one side and 20b and 20e at the other side. The panels 12b and 20b, in turn, have longitudinal extensions 12a and 20a which terminate at the cut line C. In the scores between the panels 12b and 12a and 20b and 20a are short cuts C, which aid in the folding of the blank in a manner well understood in this art. Similarly, the panel 10d has connected extensions divided by double score lines into the connected panels 12d and 12f and 20d and 20f. The panels 12d and 20d have the longitudinal extensions 12c and 20c defined by double score lines, which include the cuts C.

The main panel 10 has lateral extensions on each side, which are subdivided into panels 12, 14, 16 and 18 on the one side, and 20, 22, 24 and 26 on the other side defined by the double score lines S. Panels 18 and 26 in turn have longitudinal extensions as shown. In the case of the panel 18 these extensions are subdivided by double score lines into panels 18a, 18b, 18c and 18d. In the score lines between these panels are the cuts C as before. Similarly, the panel 26 has longitudinal extensions which are subdivided by double score lines into the panels 26a, 26b, 26c and 26d. The cuts C are present as in the previous case.

Figure 2:
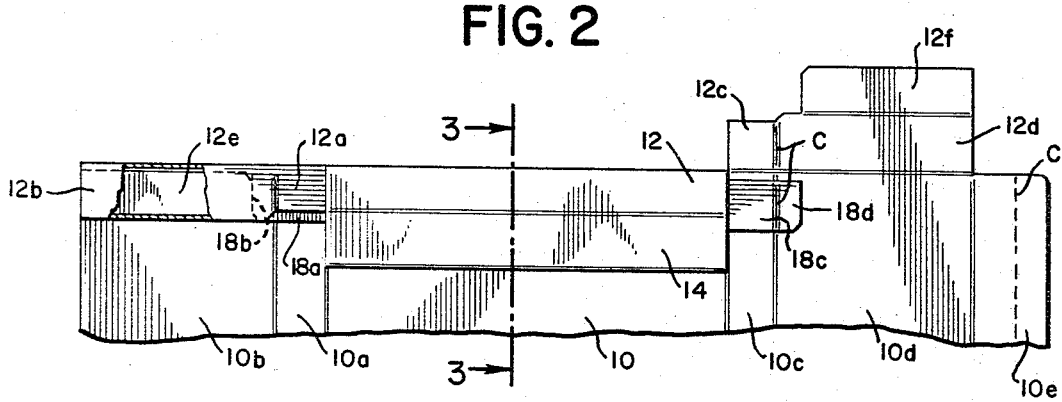
FIGURE 2 is a plan view partly in section of the upper portion of the carton blank partially processed to show the relationship of the parts at this stage.

This blank is prepared by folding and gluing, so as to be substantially flat for packing and shipping to the point of use. This processing is illustrated in part for the upper half of the blank of FIG. 1, as shown in FIG. 2. The underface of the panel 18 and its extensions have an adhesive applied thereto and the panels 12, 14, 16 and 18 are folded over so that the face of the panel 18, to which the adhesive has been applied, is secured to the upper face of panel 10, as is clear in FIG. 6 and thus becomes the base of one of the tubular side walls of the carton. As shown in FIG. 2, the extensions 18a, 18b, 18c and 18d are also glued down in place against those parts of the panels 10a, 10b, 10c and 10d which they overlie. The panels 12, 14 and 16 are also folded flat so as to overlie the panel 10, as clearly shown in FIG. 3. Similarly, an adhesive is applied to the underface of the panel 12e, so that it can be folded upon the panel 12b and the two together folded over on the panel 10b so that panel 12e is glued to panel 10b, see FIG. 4. It is noted, however, that no glue is applied to the underface of the panel 12a so that it is free, as indicated in FIG. 4. The panels 12c, 12d and 12f at the right end of the blank are glued and folded, as just explained for the panels at the left end of the blank. All of the panels at the lower side of the blank of FIG. 1 are similarly folded and glued so that the carton in this partially prepared state is generally flat and can be stacked and packaged for transmission to the place of use.

Figure 3:
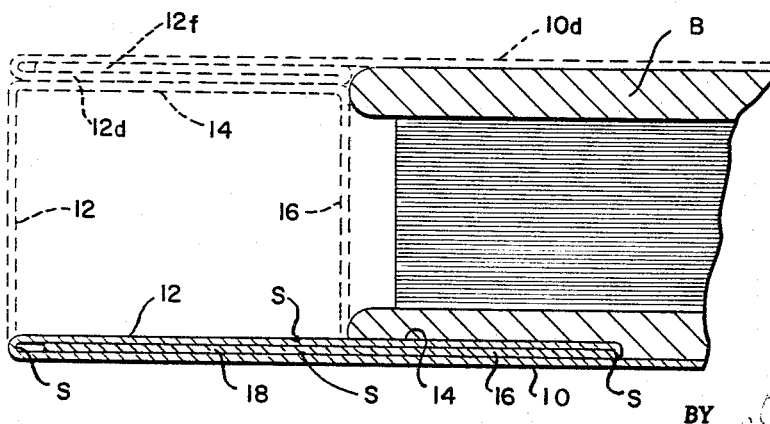
FIGURE 3 is a cross-sectional view taken on the line 3—3 of FIGURE 2, showing the relationship of the carton parts in full line prior to erection and by dotted lines after erection.

At the place of use panels 12, 14 and 16 are erected to the rectangular tubular relationship shown in dotted lines in FIG. 3 and in full lines in the other figures. This can be done by machinery and at the same time glue can be applied to the exposed faces of the panels 12b, 12d, 20b and 20d. The book B is then deposited in the container between the rectangular tubular walls which extend along an opposite pair of sides of the bottom panel 10, as indicated in FIGS. 3 and 4. It is to be noted that the spine of the book will lie parallel to the panel 10a or, if turned around 180°, will lie parallel to the panel 10c. The top and the bottom of the book then lie along the face of the rectangular buffer assemblies, which are positioned, as explained, at an opposite pair of sides of the bottom panel 10. The machine then begins to fold up the panels 10a and 10c so as to engage the spine and the opposite edge of the book and ultimately the panels 10b and 10d are folded down so as to lie across the tops of the rectangular tubular walls referred to and the book so as to be parallel with the bottom wall as indicated in FIG. 5. It will be recalled that glue has been applied to the exposed faces of the panels 12b, 20b, 12d and 20d, so that when they are brought into contact with the tops of the tubular buffer walls, as for example the wall 14 in the one case illustrated, they will adhere thereto, see FIG. 6. The extension 10e will be glued down against the edge of the cover flap 10b which it overlies, glue being applied preferably inside of the interrupted cut line C, leaving the area outside that line unattached to provide a place to grasp the cover 10d and break the glue joint when the container is opened. From a careful consideration of the FIGURES 4, 5 and 6 it will be seen that at each open end of each tubular buffer wall the container will be reinforced by the multi-plied construction provide by the overlapping of the smaller panels 12a and 18a. It will be seen also that the panel 18b lies in the plane of the panel 12e, see FIG. 6. Panel 12e is shorter, as will be seen from FIG. 1, to provide the space for the panel 18b. The same is true, of course, at each of the other corners, since the panels 12f, 20e and 20f are also shortened for the same purpose. It has been found that with this construction the multi-plied corners which result are extremely resistant to crushing under impact and thereby protect the book B at all four of these corners.

Similar advantages in all respects are obtained from the construction shown in FIGS. 7 to 11 inclusive. In these figures similar reference characters have been used, wherever applicable, to simplify the explanation. Thus, the bottom panel 110 in this modification corresponds to the bottom panel 10 of the previously described form. This blank is symmetrical about a longitudinal axis and so only the upper half thereof has been shown. The panel 110 has extensions which are subdivided by double score lines S at the respective ends into the panels 110a and 110b and 110c and 110d and 110e. The panels 110b and 110d have lateral extensions which are subdivided into panels 112b, 112e, 112d and 112f by double score lines. In addition, the panels 112b and 112d have longitudinal extensions which are formed by score lines and the cuts C into the smaller panels 112a and 112c. Similarly the panels 112e and 112f have longitudinal extensions forming short panels 112g and 112h.

The bottom panel 110 has lateral extensions which are subdivided into panels 112, 114, 116 and 118 by the double score lines S. It is noted that panels 112a and 112c are separated from the panel 112 by the cuts C. The panel 118 has longitudinal extensions forming small panels 118a and 118c. The lower half of the panel is correspondingly cut and is subdivided so as to be comparable to the upper half shown in FIGURE 7.

The blank is shown partially prepared in FIG. 8, in a maner quite comparable to the showing of the first form in FIG. 2. The only difference to be noted is that the short panels 112g and 118a, which are glued down against the inner face of the panel 110a have been shortened so as to be slightly separated, as clearly shown in several of the figures, see, for example, FIGS. 9 and 10. The panel 112a is not glued down but is left free. The relationship of these panels is the same, of course, at each of the other three corners.

The book B is placed in the erected carton at the point of use, as before, so that its top and bottom engage the tubular buffer walls at an opposite pair of sides of the bottom wall 110. When the box is closed by the folding over and the gluing down of the flaps 110b and 110d the various panels will be in the relationship clearly depicted in FIGS. 10 and 11. The panels 112 are cut back at the ends, as shown at CB, see FIGS. 7 and 11, to provide a space in which the panels 118a, 112a and 112g can lie without crowding and form a multi-wall closure for the ends of the tubular buffers.

Figure 12:
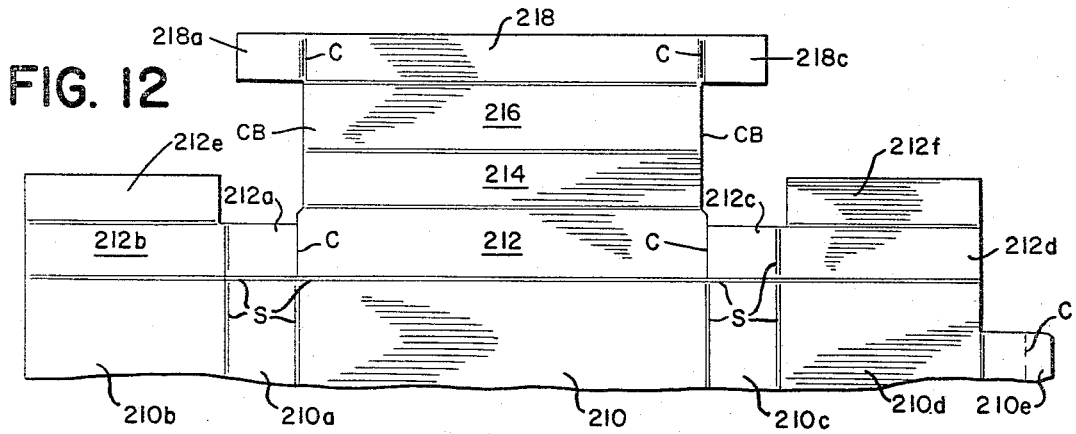
FIGURE 12 is a plan view of the upper half of a second modified form of carton blank in accordance with this invention.

A second modification is clearly shown in FIGS. 12 to 17 inclusive and is more nearly like the structure of FIGS. 1 to 6 inclusive than the structure of FIGS. 7 to 11 inclusive. The construction of this second modification is particularly adapted for the packaging of thick books wherein the tubular buffer walls are therefore higher. The blank for this construction is shown in FIG. 12 and, as before, the bottom wall 210 has the longitudinal extension panels 210a and 210b at one end and 210c, 210d and 210e at the other end. These longitudinal extensions of the bottom wall, in turn, have lateral extensions. Thus, the panel 210b has the lateral extensions 212b and 212e, while the panel 210d has the lateral extensions 212d and 212f.

In this construction there are the small panels 212a and 212c which can be considered extensions of both of the walls to which they are considered extensions of both of the walls to which they are connected, namely walls 212b and 210a, but terminate at the cut line C. The construction is the same at the other end for the panel 212c. The bottom panel 210 has a lateral extension which is subdivided by score lines into the panels 212, 214, 216 and 218 which becomes the base of the rectangular buffer walls. The panel 218 has longitudinal extensions 218a and 218c. As in the previous cases the lower half of the blank is of the same construction.

Figure 13:
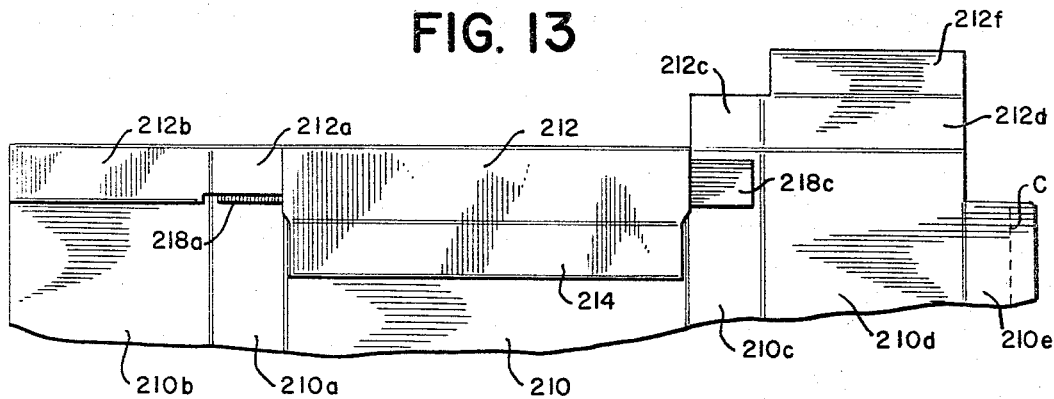
FIGURE 13 shows portions of the blank of FIGURE 12 in folded condition.
Figure 14:
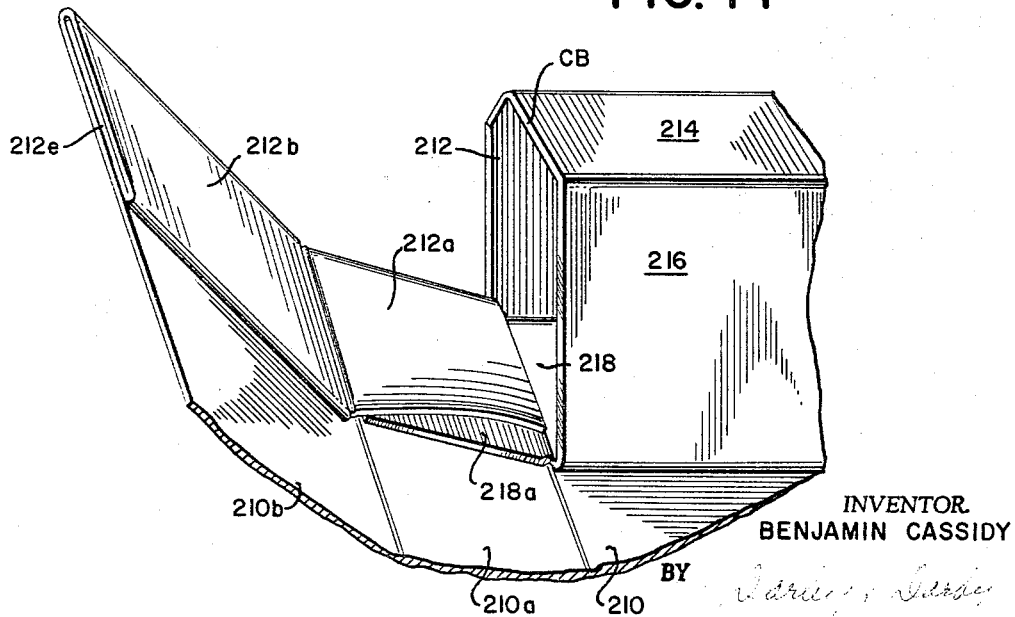
FIGURE 14 is a broken perspective view of a corner of a carton made from the blank of FIGURE 12 showing the relationship of the parts when the carton is partially closed.

FIGURE 13 shows the partially prepared blank in a manner corresponding to the illustrations in FIGS. 2 and 8 for the previous constructions. In this case it is noted, however, that the panels 218a and 218c are glued down against the inner faces of the panels 210a and 210c. The panels 212a and 212c are left free, as clearly shown in FIG. 14.

Figure 15:
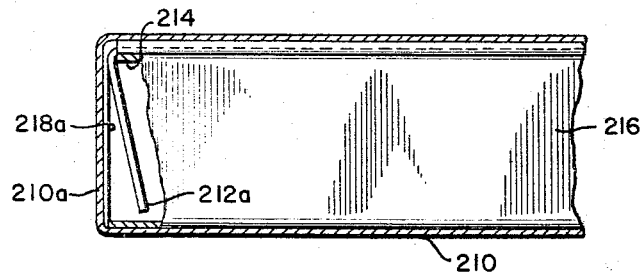
FIGURE 15 is a cross-sectional view taken on the lines 15—15 of FIGURE 16.
Figure 16:
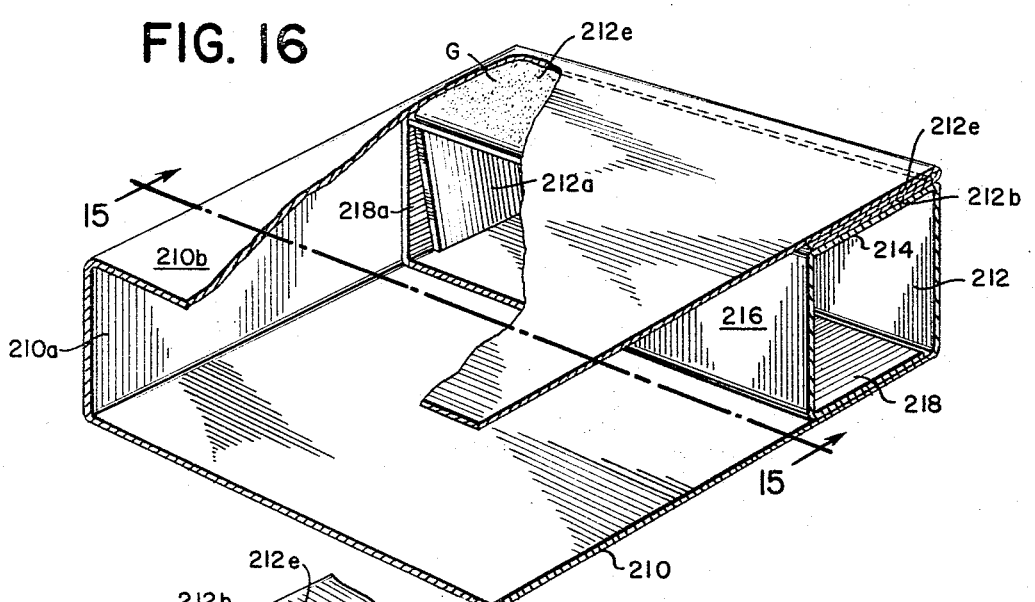
FIGURE 16 is a perspective view of a corner of the carton completely closed with various parts broken away for better illustrative purposes.
Figure 17:
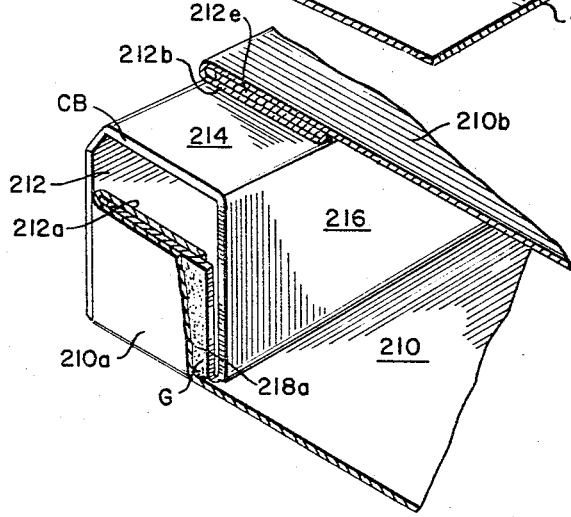
FIGURE 17 is a similar perspective view from another angle of the same corner.

The other figures, that is, FIGS. 15, 16 and 17 have additional views showing the relationship of the parts when the container is completely erected and sealed shut. In this case the open ends of the rectangular buffers at an opposite pair of sides of the bottom wall 10 are reinforced by the multi-plies resulting from the overlapping of the panels 210a, 218a and 212a, see FIG. 16, for example.

FIG. 17 shows that the ends of the panels 214, 216 and 218 are cut back at CB to provide a space in which the multi-plies of these reinforced corners can lie so as to give a sharp rectangular corner, which, in this respect, differs from the carton of FIGS. 1 to 6 inclusive, where no such cut back is used.

From the above description, wherein applicant has submitted three embodiments illustrative of the invention herein, it will be readily apparent that the details of this invention are capable of some variation. It is proposed, therefore, that the scope of protection afforded hereby be determined from the appended claims.

What is claimed:

1. A container of the type described, comprising a rectangular enclosure of fibrous material having parallel top and bottom walls, rectangular tubular walls positioned at an opposite pair of edges of said bottom wall, a pair of planar walls at the remaining pair of edges of said bottom wall overlapping the ends of said tubular walls, an extension at each end of the base of each tubular wall overlying and secured to the adjacent ends of said planar walls so as to also overlap the adjacent ends of said tubular walls, and said top wall being formed of a pair of flaps extending from the top edges of said planar walls, each flap having its side edges double-folded and secured together so that the edges of the flaps have three layers.

2. In the combination of claim 1, said tubular wall base extensions also overlapping an adjacent area of the top wall and secured thereto.

3. In the combination of claim 1, said tubular wall extensions being shorter than the height of said planar walls.

4. In the combination of claim 1, the outermost layer of each double-folded flap extending so as to overlie the adjacent tubular side wall base extension.

5. In the combination of claim 1, an extension comprising a continuation of the outer layer of said double-folded flap side edges and a continuation of the planar wall positioned to overlie said tubular wall base extensions.

6. In the combination of claim 5, the outermost layer of each double-folded flap extending so as to overlie the adjacent tubular side wall base extension.

7. In the combination of claim 3, the front edges of each top wall flap having extensions overlying the ends of the planar walls and said tubular wall base extensions.

References Cited

UNITED STATES PATENTS

| | | | |
|---|---|---|---|
| 1,207,899 | 12/1916 | Greve | 229—33 |
| 1,331,009 | 2/1920 | Ford. | |
| 2,684,758 | 7/1954 | Aquino | 229—40 X |
| 2,686,629 | 8/1954 | Inman | 229—51 X |
| 2,755,982 | 7/1956 | Vander Lugt. | |
| 3,003,676 | 10/1961 | De Nola. | |
| 3,034,697 | 5/1962 | Frankenstein | 229—31 |
| 3,160,344 | 12/1954 | Bogren | 229—40 |
| 3,250,455 | 5/1966 | Plunkett | 229—40 X |

JOSEPH R. LECLAIR, *Primary Examiner.*

DAVID T. MOORHEAD, FRANKLIN T. GARRET,
*Examiners.*